Jan. 30, 1968 F. S. DELLENBAUGH III 3,366,806
PHASE SENSITIVE BI-STABLE LATCHING CIRCUIT
USING A SINGLE TRANSISTOR
Filed Feb. 28, 1966
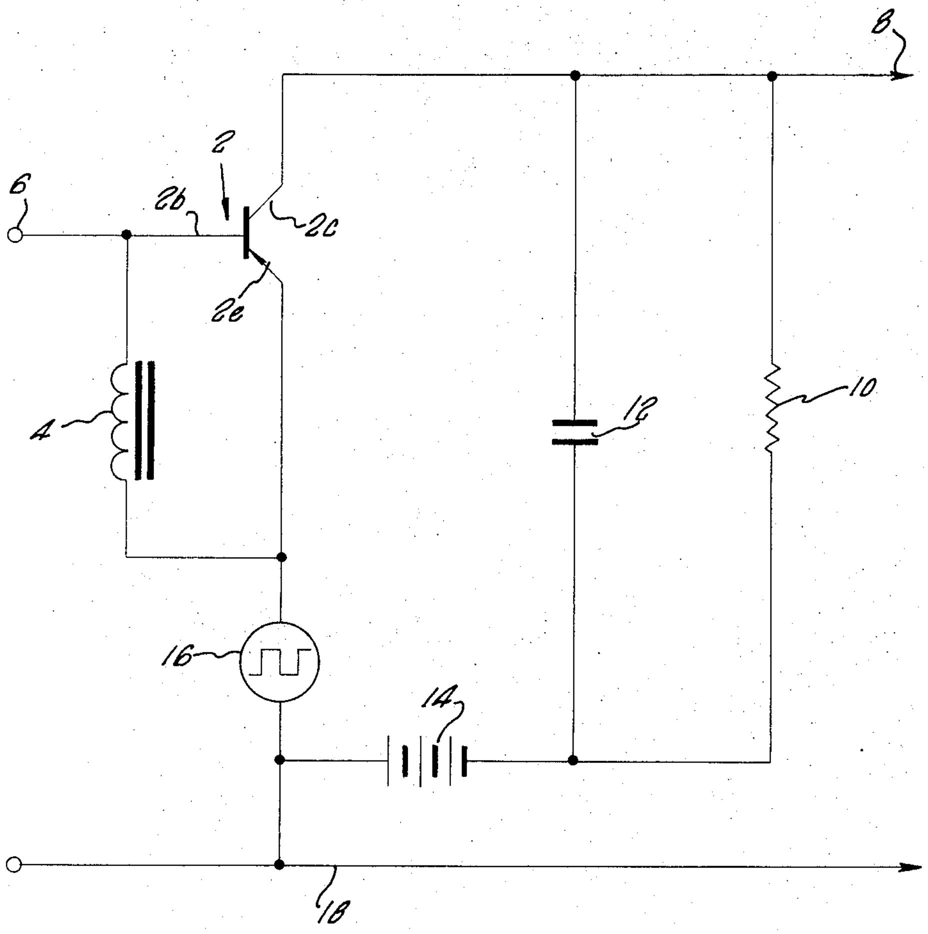
INVENTOR.
FREDERICK S. DELLENBAUGH, III
BY
Christie, Parker & Hale
ATTORNEYS 3,366,806

PHASE SENSITIVE BI-STABLE LATCHING CIRCUIT USING A SINGLE TRANSISTOR

Frederick S. Dellenbaugh III, Fairfield, Conn., assignor to Consolidated Electrodynamics Corporation, Pasadena, Calif., a corporation of California Filed Feb. 28, 1966, Ser. No. 530,477
7 Claims. (Cl. 307—262)

This invention relates to a latching circuit, and in particular to a transistorized bi-stable circuit which is phase sensitive. Such a circuit is useful as an alarm and relay-switching circuit.

A conventional bi-stable electronic circuit normally comprises two active elements and two passive elements such as capacitors as energy-storage devices. By proper bias on each of the active elements, the change of state of the circuit can be synchronized with a predetermined change in an external signal applied to the input terminals of the circuit. The circuit of this invention provides a bi-stable circuit which utilizes a single active element and two passive elements, a capacitor and inductor to provide energy storage.

The invention provides a phase sensitive latching circuit comprising a transistor having emitter, collector and base electrodes with an inductor connected between the emitter and base electrodes. A charge storage means is connected in parallel with a resistive means between the emitter and collector electrodes. A unipolar voltage source and a bipolar voltage source are connected in series with the parallel combination of the charge storage and resistive means. Connected to the terminal common to the unipolar and bipolar voltage sources is a common terminal for the circuit. An input terminal is connected to the terminal common to the inductor and base electrode of the transistor. An output terminal is connected to the terminal common to the collector electrode and resistor-charge storage means combination.

Circuit operation is based on the storage of energy in an inductance and capacitance. The circuit is locked "on" and turned "off" by triggering it at the proper time with respect to the phase of the bipolar voltage source, a square-wave generator. Depending on the Q of the inductor, the triggering pulse can be of short duration relative to the duration of a half-cycle of the square-wave generator. The higher the Q of the inductor, the more efficient the circuit is.

For a more thorough understanding of the invention, reference should be had to the accompanying drawing which is a schematic diagram of the circuit of the invention. Referring to the drawing, a transistor 2 having emitter, collector, and base electrodes designated 2*e*, 2*c* and 2*b* respectively, is connected in a common emitter configuration. Connected between the electrodes 2*b* and 2*e* is an inductor 4. An input terminal 6 is connected to the base electrode 2*b*.

The collector electrode 2*c* is connected to an output terminal 8 and the parallel combination of a resistor 10 and a capacitor 12. The other common terminal of the resistor-capacitor combination is connected in series with a battery 14 and square-wave generator 16. The square-wave generator is in turn connected in common with the terminal common to the emitter electrode 2*e* and inductor 4. A common terminal 18 for the circuit is connected to the point common to the battery 14 and the square-wave generator 16. The circuit as shown employs a PNP type of junction transistor and the polarity of the battery is arranged such that the collector is reversed biased. Where an NPN transistor is substituted for transistor 2, the polarity of the various connections shown in FIG. 1 are reversed, and the various phase relationships of the circuit are also reversed.

In operation, the transistor is normally non-conducting, and the bias on the emitter is alternately positive and negative under the influence of the output of the square-wave generator 16. For the particular circuit configuration and type of junction transistor depicted in FIG. 1, a positive pulse at the input terminal in phase with the negative half cycle of the square wave is necessary to initiate circuit operation. The effect of the simultaneous occurence of the positive pulse at the input terminal and the negative half cycle of the square wave causes current flow through the inductor 4, thereby storing energy in the inductor. For proper operation of the circuit, the period of the square wave is selected such that it is substantially longer than the period of any triggering pulse to be encountered.

When the polarity of the square-wave generator reverses (a positive half-cycle), the energy stored in the inductor 4 forward biases the emitter-base junction causing the transistor to conduct and capacitor 12 to charge. On the next reversal of polarity of the square-wave generator (the next negative half-cycle), the collector-base diode of the transistor 2 is now forward biased due to the charge standing on the capacitor 12, and a current flow through inductor 4 is xperienced due to the discharge of the capacitor 12 through the collector and base of the transistor. This current flow into inductor 4 again serves to store energy therein in the same fashion as during the coincidence of the negative half-cycle of the square-wave generator and a positive pulse at the input terminal during the initiation of circuit operation. Storage of energy in the indicator again forward biases the transistor during the next half-cycle of the square wave thereby setting up a flow of energy between inductor and capacitor to sustain circuit operation. This oscillating action continues until an external influence is exerted on the circuit to change it from the latched to the unlatched state.

The circuit can be changed from the latched to the unlatched condition in one of several ways. For example, shorting inductor 4 with a resistor of the proper size or opening of any one of several leads in the circuit will cause the circuit to be triggered off. The circuit is also triggered off by the occurrence of a signal at the input terminal of the circuit having the proper phase relation with the output of the square-wave generator. This condition is the occurrence of a positive pulse in phase with the positive half-cycle of the square-wave generator. Providing the pulse at the input is of sufficient magnitude, the forward bias on the emitter-base diode is neutralized thereby preventing conduction of the transistor and storage of energy in the capacitor. In this way, the conduction of the transistor is stopped, and the signal at the output terminal changes to that encountered in the unlatched condition. The circuit remains in this condition until the subsequent occurrence of a positive pulse at the input terminal in phase with the negative half-cycle of the generator.

The preceding description has been specifically directed toward a phase-sensitive latching circuit employing a PNP type junction transistor and a specific battery polarity. The same action can be achieved with an NPN type transistor with the following differences. The polarity of battery 14 is reversed and the latched and unlatched condition of the circuit are induced by pulses of polarity opposite that encountered in the preceding description. In this case, conduction of transistor 2 is induced by a negative pulse in phase with the positive half-cycle of the square-wave generator. In the same way, the circuit is turned off or unlatched by the occurence of a negative pulse in phase with the negative half-cycle of the square-wave generator.

Applications for such a circuit include use in an alarm where the inductance 4 is that of a relay coil and uses as a switch where changes of state of the circuit are used in a control function wherein the circuit in the latched condition is used to operate and hold a relay until the circuit is unlatched.

What is claimed is:

1. A phase-sensitive latching circuit comprising a transistor having emitter, collector and base electrodes, an inductor connected between the emitter and base electrodes, a parallel combination of a resistor and charge storage means having two terminals, the combination being connected at one terminal to the collector electrode, a unipolar and a bipolar voltage source connected in a series circuit relationship between the other terminal of the parallel combination of resistor and charge storage means and the emitter electrode, means for applying an input signal cross the base and emitter electrodes, and means for obtaining an output signal across the collector and emitter electrodes.

2. A phase-sensitive latching circuit comprising a transistor having emitter, collector and base electrodes, an inductor connected between the emitter and base electrodes, a parallel combination of a resistor and a charge storage means having two terminals, the combinations being connected at one terminal to the collector electrode, a direct current voltage source and a bipolar voltage source connected in series circuit relationship between the other terminal of the parallel combination of resistor and charge storage means and the emitter electrode, a common terminal connected in common with the direct current and bipolar sources, a source of input signals connected in common with the inductor and base electrodes and a source of output signals connected in common with the collector electrode and the charge storage means-resistor combination.

3. A phase-sensitive latching circuit comprising a transistor having emitter, colector and base electrodes, an inductor connected between the emiter and base electrodes, a parallel combination of a resistor and a charge storage means having two terminals, the combination being connected at one terminal to the collector electrode, a direct current voltage source and a square-wave generator connected in series circuit relationship between the other terminal of the parallel combination of resistor and charge storage means and the emitter electrode, a common terminal connected in common with the generator and direct current source, a source of input signals connected in common with the inductor and base electrode and a source of output signals connected in common with the collector electrode and the charge storage means-resistor combination.

4. A phase-sensitive latching circuit comprising a PNP transistor having emitter, collector and base electrodes, an inductor connected between the emitter and base electrodes, a parallel combination of a resistor and a capacitor having two terminals, the combination being connected at one terminal to the collector electrode, a direct current voltage source having a positive and a negative terminal, the negative terminal of the source being connected to the other terminal of the resistor-capacitor combination, a square-wave generator connected between the positive terminal of the direct current source and the emitter elecrode, a common terminal connected in common with the generator and the positive terminal of the direct current source, a source of input signals connected in common with the inductor and base electrode and a source of output signals connected in common with the collector electrode and the capacitor-resistor combination.

5. A latching circuit according to claim 4 wherein the coincidence of a positive pulse at the source of input signals with the negative half-cycle of the generator renders the transistor conductive.

6. A latching circuit according to claim 5 wherein the coincidence of a positive pulse at the source of input signals and the positive half-cycle of the generator renders the transistor non-conductive.

7. A bi-stable switching circuit comprising a normally non-conducting junction transistor having emitter, collector and base electrodes connected in a common emitter configuration, an inductor connected between the base and emitter electrodes and an input terminal connected in common with the inductor and base electrode, a series combination connected between the collector and emitter electrodes comprising a parallel combination of a resistor and a capacitor, a battery and a square-wave generator, the positive terminal of the battery being connected to the generator, an output terminal connected in common wih the collector electrode and capacitor-resistor combination and a common terminal connected in common with the battery and generator so that when the transistor is non-conducting a signal of positive polarity at the input erminal coinciding with the negative half-cycle of the generator renders the transistor conductive.

No references cited.

ARTHUR GAUSS, *Primary Examiner.*

J. A. JORDAN, *Assistant Examiner.*